(12) United States Patent
Ramasamy et al.

(10) Patent No.: US 11,233,814 B2
(45) Date of Patent: Jan. 25, 2022

(54) METHOD AND SYSTEM FOR AUTOMATICALLY IDENTIFYING AND CORRECTING SECURITY VULNERABILITIES IN API

(71) Applicant: Accenture Global Solutions Limited, Dublin (IE)

(72) Inventors: Manoharan Ramasamy, Bangalore (IN); Satish Janardhanan, Mumbai (IN); Manjunatha Beedimane Ramachandra Shetty, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 98 days.

(21) Appl. No.: 16/653,045

(22) Filed: Oct. 15, 2019

(65) Prior Publication Data

US 2021/0112088 A1    Apr. 15, 2021

(51) Int. Cl.
*H04L 29/06* (2006.01)
*G06F 9/54* (2006.01)

(52) U.S. Cl.
CPC .......... *H04L 63/1433* (2013.01); *G06F 9/541* (2013.01); *H04L 63/20* (2013.01)

(58) Field of Classification Search
None
See application file for complete search history.

(56) References Cited

U.S. PATENT DOCUMENTS

| | | |
|---|---|---|
| 9,652,618 B1 | 5/2017 | Lerner |
| 2013/0132584 A1 | 5/2013 | Palladino et al. |
| 2015/0033348 A1 | 1/2015 | Oliphant et al. |
| 2016/0182296 A1* | 6/2016 | Sharp-Paul ......... H04L 41/0869 709/224 |
| 2019/0007443 A1* | 1/2019 | Cook ...................... H04L 63/20 |
| 2019/0213326 A1* | 7/2019 | Dykes ................... G06F 21/552 |

OTHER PUBLICATIONS

Liu et al., Cloud Service Portal For Mobile Device Management, 2010, IEEE International Conference on E-Business Engineering, pp. 474-478. (Year: 2010).*
Laverty et al., Comparative Analysis of Mobile Application Development and Security Models, 2011, Issues in Information Systems, vol. XII, No. 1, pp. 301-312, 2011. (Year: 2011).*
Apigee, "Securing a proxy," Apigee Docs, retrieved from the Internet on Oct. 1, 2019, pp. 1-2, published online by Apigee at URL https://docs.apigee.com/api-platform/security/api-security.
European Search Report issued in European application 20192865.2, dated Dec. 23, 2020, pp. 1-9, European Patent Office, Munich, Germany.

* cited by examiner

*Primary Examiner* — Luu T Pham
*Assistant Examiner* — Edward X Long
(74) *Attorney, Agent, or Firm* — Crowell & Moring LLP

(57) ABSTRACT

System and methods are provided to identify static security vulnerabilities in an API. The security vulnerabilities may be in API proxy bundle, which includes a configuration of an API proxy for the API. The API proxy is executable in an API gateway of an API management platform. A search is performed of any security policy specified in an API proxy bundle. A compliance failure may be determined, which is a failure of the configuration of the API proxy to comply with a set of security rules. The API proxy bundle may be corrected to address the compliance failure.

12 Claims, 10 Drawing Sheets

METHOD AND SYSTEM FOR AUTOMATICALLY IDENTIFYING AND CORRECTING SECURITY VULNERABILITIES IN API

TECHNICAL FIELD

This application relates to security and, in particular, to application programming interface security.

BACKGROUND

Application programming interfaces (APIs) are critical in digital businesses. As a result, API management platforms have become common. An API management platform may provide, among others, services to developers to help developers manage and deploy APIs. APIs deployed in API management programs may be subject to a wide variety of security vulnerabilities. Accordingly, there is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

FIG. 8 illustrates a second example of a graphical user interface that includes an API vulnerability report;

FIG. 9 illustrates an example of a graphical user interface through which security policy rules may be entered, deleted, and/or configured.

DETAILED DESCRIPTION

Figure 1:
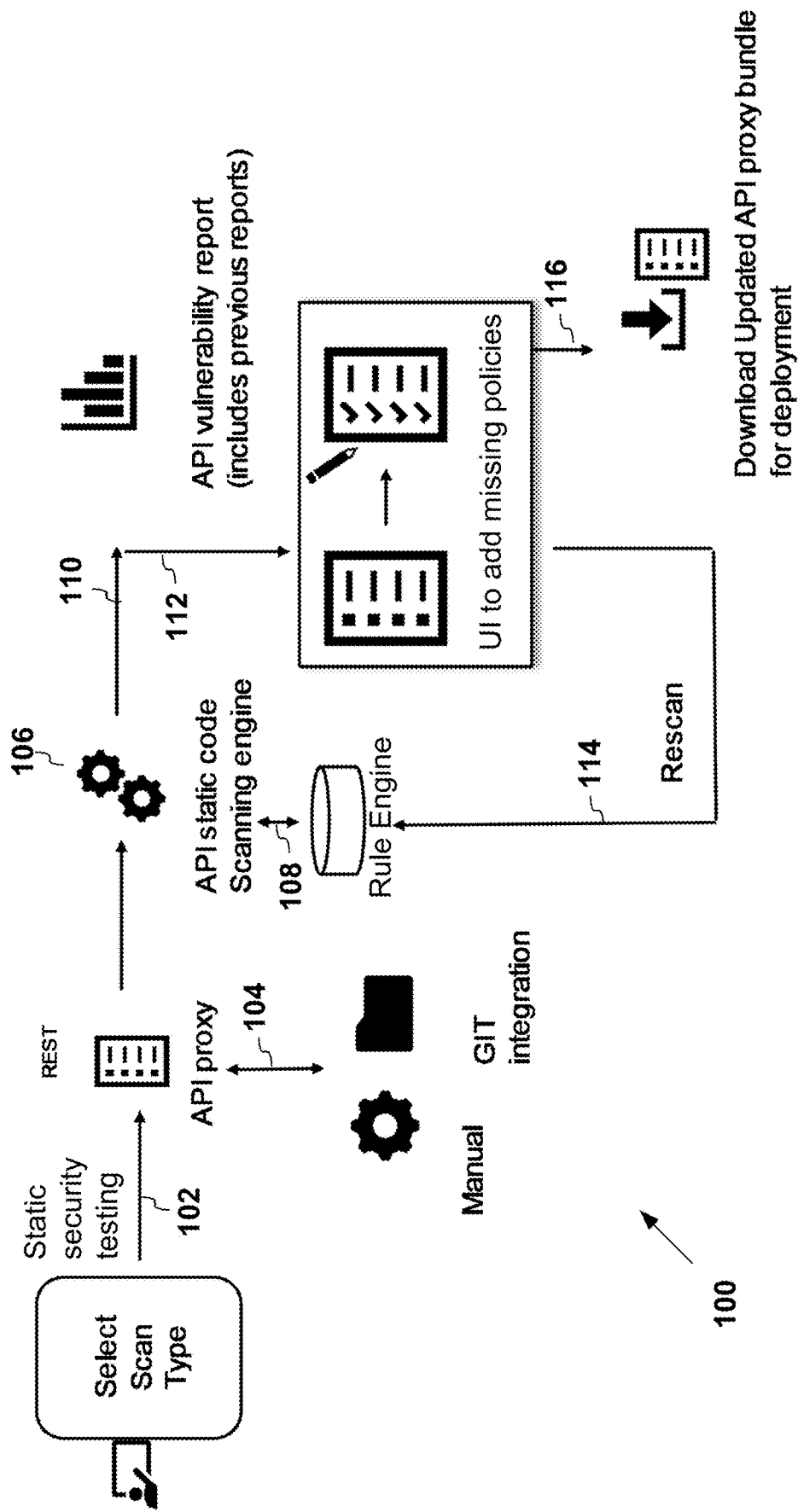
FIG. 1 is a flow diagram of an example of a method to identify and correct security vulnerabilities in API proxies.

An important component of an API management platform is an API gateway. Generally speaking, an API gateway receives API calls from client devices and then routes the calls to a corresponding backend service or services. An API proxy is executable in the API gateway of the API management platform. Any call to the API from a client device passes through the API proxy. A configuration of the API proxy is included in an API proxy bundle, which may include, for example, XML having elements that describe the API and associated features. In some examples, the API proxy bundle may include one or more XML configuration files and code (such as code written in JavaScript, Java, and/or Python). Among other things, the configuration of the API proxy identifies zero or more security policies associated with the API proxy. The security policies may be enforceable by the API gateway. In some examples below, the API proxy bundle is referred to as a development project.

A security policy (or just "policy" for short) may be a security requirement enforced by the API gateway. The security policy may be an "out-of-the-box" policy provided by the API gateway, or a custom policy that is implemented by a third party. The security policy is configurable within, and enforced by, the API gateway. As a result, the API may be controlled using security policies. The security policy may be associated with zero or more APIs and/or API flows. Security policies provide features such as security, rate-limiting, transformation, and mediation capabilities. Some security policies are currently being defined—and will likely continue to be defined in the future—by security standard organizations, such as the Open Web Application Security Project (OWASP). As a result, API gateway providers may have security policies with common names, like JSON-ThreatProtection. Nevertheless, the available security policies and/or their names may depend on the API management platform. An example of the JSONThreatProtection policy identified in the API proxy bundle for deployment in an API gateway provider is:

```
<?xml version="1.0" encoding="UTF-8" standalone="yes"?>
<JSONThreatProtection async="false" continueOnError="false"
enable="true"
name="JSONThreatProtection">
    <DisplayName>JSONThreatProtection</DisplayName>
    <Properties/>
    <ArrayElementCount>20</ArrayElementCount>
    <ContainerDepth>10</ContainerDepth>
    <ObjectEntryCount>15</ObjectEntryNameLength>
    <Source>request</Source>
    <StringValueLength>500</StringValueLength>
</JSONThreatProtection>
```

Note that one of the properties of the JSONThreatProtection element is "enabled". In the example above, the "enabled" property is set to "true", indicating that the API gateway is to enforce the JSONThreatProtection policy. Security policies provided by the API management platform typically are categorized. A category is a type of security policy. Below are three example categories of security policies and examples of policies in each:

1. Authentication and Authorization: includes policies responsible for authentication and authorization
   AccessControl policy
   BasicAuthentication policy
   VerifyJWT policy
   VerifyAPIKey policy
   SAMLAssertion policy
   Oauth1.0
   Oauth2.0
2. Traffic Management: includes policies to control/manage API traffic
   JSONThreatProtection policy
   XMLThreatProtection policy
   ConcurrentRateLimit policy
   Quota policy
   SpikeArrest policy
   SOAPMessageValidation policy
3. Logging: includes policies responsible for logging
   MessageLogging policy The security policy may be dynamically enforced by the API gateway. For example, the API gateway may perform a check on an incoming API call for compliance with a particular security policy. If the appropriate security policies are not specified in the API proxy bundle, then the API gateway may not enforce the appropriate security policies.

Software developers are often not aware of all of the appropriate security policies to specify in the API proxy bundle. Software developers may mistakenly omit appropriate security policies from the API proxy bundle. Alternatively or in addition, software developers may specify a security policy in the API proxy bundle, but fail to enable the policy in the API proxy bundle, and as a result, the API gateway may not actually enforcement the policy.

In some examples, a technical advantage of the systems and methods described below is the identification of security vulnerabilities resulting from a manner in which the security policies are specified in, or omitted from, the API proxy bundle. Another technical advantage of the systems and methods described below may be correcting security vulnerabilities by updating the API proxy bundle. Yet another technical advantage of the systems and methods described below may be an ability to create a set of security policy rules that apply to the API proxy bundle. A security policy rule is a rule that describes if and/or how a security policy is to be specified in the API proxy bundle.

In one example, a system is provided for identifying security vulnerabilities related to an application programming interface (API), the system comprising: a processor; and a memory accessible by the processor, the processor configured to: search for any security policy specified in an API proxy bundle, the API proxy bundle including a configuration of an API proxy for the API, wherein the API proxy is executable in an API gateway of an API management platform, and wherein the configuration of the API proxy identifies zero or more security policies associated with the API proxy and enforceable by the API gateway; determine a compliance failure, which is a failure of the configuration of the API proxy to comply with a set of security rules; and cause an indication of the compliance failure to be outputted.

In another example, a non-transitory computer readable storage medium comprising computer executable instructions, the computer executable instructions executable by a processor, the computer executable instructions comprising: instructions executable to search for any security policy specified in an API proxy bundle, the API proxy bundle including a configuration of an API proxy for the API, wherein the API proxy is executable in an API gateway of an API management platform, and wherein the configuration of the API proxy identifies zero or more security policies associated with the API proxy and enforceable by the API gateway; instructions executable to determine a compliance failure, which is a failure of the configuration of the API proxy to comply with a set of security rules; and instructions executable to cause an indication of the compliance failure to be outputted.

In yet another example, a computer-implemented method is provided to identify and correct security vulnerabilities, the method comprising: searching for any security policy specified in an API proxy bundle, the API proxy bundle including a configuration of an API proxy for the API, wherein the API proxy is executable in an API gateway of an API management platform, and wherein the configuration of the API proxy identifies zero or more security policies associated with the API proxy and enforceable by the API gateway; determining a compliance failure, which is a failure of the configuration of the API proxy to comply with a set of security rules; and causing an indication of the compliance failure to be outputted.

FIG. 1 is a flow diagram of an example of a method 100 to identify and correct security vulnerabilities in API proxies. Operations may begin by a user selecting (102) a type of security scan. Specifically, the user may select a static security test as the type of security scan. Other types of tests may be available to the user.

Operations may continue by obtaining (104) the API proxy bundle. For example, the API proxy bundle may be uploaded in response to user input. Alternatively, the API proxy bundle may be obtained automatically, such as through integration with a Git source control system and/or with the API management platform.

A scanning engine may scan (106) static API code in the API proxy bundle for potential security vulnerabilities. In order to perform the scan, the scanning engine may apply security policy rules obtained (108) from a rules engine. As part of the scan, the API proxy bundle is searched for any security policy specified in the API proxy bundle. Any compliance failures are determined by detecting any failures of the configuration of the API proxy to comply with the security policy rules.

Each of the security policy rules is a rule that describes if and/or how a corresponding security policy is to be specified in the API proxy bundle. For example, the security policy rule may indicate if a policy should apply to an API and/or an API flow.

As an example, a security policy rule for the JSONThreatProtection policy may require that: the enable flag be set to true; the ArrayElementCount element of the JSONThreatProtection policy be present and set to a value; the ObjectEntryCount element of the JSONThreatProtection policy be present and set to a value; and the ContainerDepth element of the JSONThreatProtection policy be present and set to a value. Alternatively, the security policy rule for the JSONThreatProtection policy may have additional, fewer, and/or different requirements than listed here.

As another example, the Quota policy may have the following specified in the API proxy bundle:

```
<Quota name="QuotaPolicy" type="calendar">
    <StartTime>2017-02-18 10:30:00</StartTime>
    <Interval>5</Interval>
    <TimeUnit>hour</TimeUnit>
    <Allow count="99"/>
</Quota>
```

A security policy rule for the Quota policy may require the enable flag to be set if the "count" property of the "Allow" element of the Quota policy is present. Alternatively, the security policy rule for the Quota policy may have additional, fewer, and/or different requirements than listed here.

As yet another example, the XMLThreatProtection policy may have the following specified in the API proxy bundle:

```
<XMLThreatProtection async="false" continueOnError="false"
enabled="true" name="XML-Threat-Protection-1">
```

```
<DisplayName>XML Threat Protection 1</DisplayName>
<NameLimits>
    <Element>10</Element>
    <Attribute>10</Attribute>
    <NamespacePrefix>10</NamespacePrefix>
    <ProcessingInstructionTarget>10</ProcessingInstructionTarget>
</NameLimits>
<Source>request</Source>
<StructureLimits>
    <NodeDepth>5</NodeDepth>
    <AttributeCountPerElement>2</AttributeCountPerElement>
    <NamespaceCountPerElement>3</NamespaceCountPerElement>
    <ChildCount includeComment="true" includeElement="true"
includeProcessingInstruction="true"
includeText="true">3</ChildCount>
</StructureLimits>
<ValueLimits>
    <Text>15</Text>
    <Attribute>10</Attribute>
    <NamespaceURI>10</NamespaceURI>
    <Comment>10</Comment>
    <ProcessingInstructionData>10</ProcessingInstructionData>
</ValueLimits>
</XMLThreatProtection>
```

A security policy rule for the XMLThreatProtection policy may require that: the "enabled" property is set to true; and the elements NameLimits, StructureLimits, and ValueLimits are present. Alternatively, the security policy rule for the XMLThreatProtection policy may have additional, fewer, and/or different requirements than listed here.

In still another example, the OAuthV2 policy may have the following specified in the API proxy bundle:

```
<OAuthV2 async="false" continueOnError="false" enabled="true"
name="OAuth-v20-2">
    <DisplayName>OAuth v2.0 2</DisplayName>
    <Operation>VerifyAccessToken</Operation>
    <AccessTokenPrefix>Bearer</AccessTokenPrefix> <!--
    Optional,
default is Bearer -->
</OAuthV2>
```

A security policy rule for the OAuthV2 policy may require that: the "enabled" property is set to true; and the "Operation" element is present. Alternatively, the security policy rule for the OAuthV2 policy may have additional, fewer, and/or different requirements than listed here.

Figure 7:
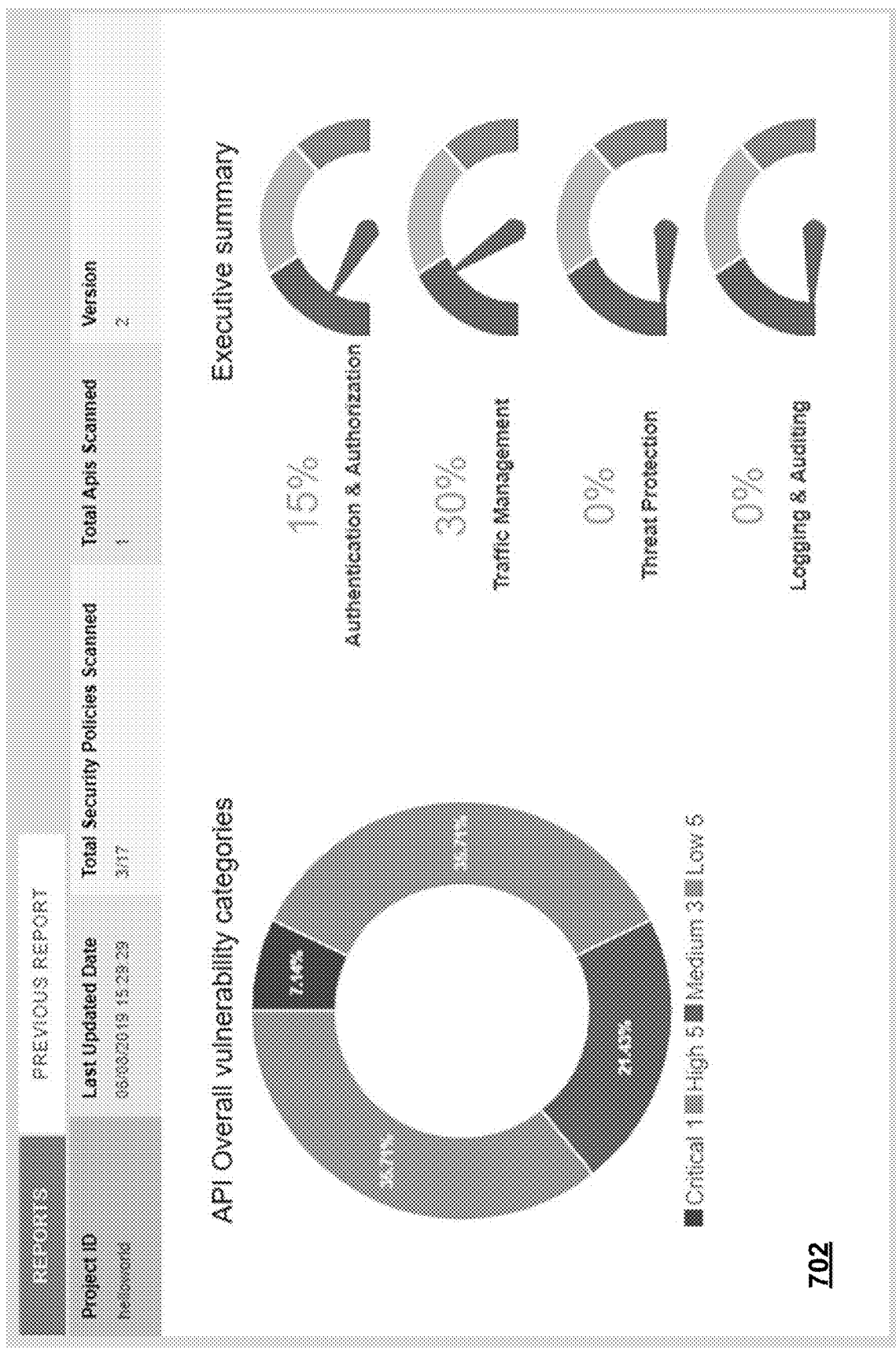
FIG. 7 illustrates a first example of a graphical user interface that includes an API vulnerability report.
Figure 8:
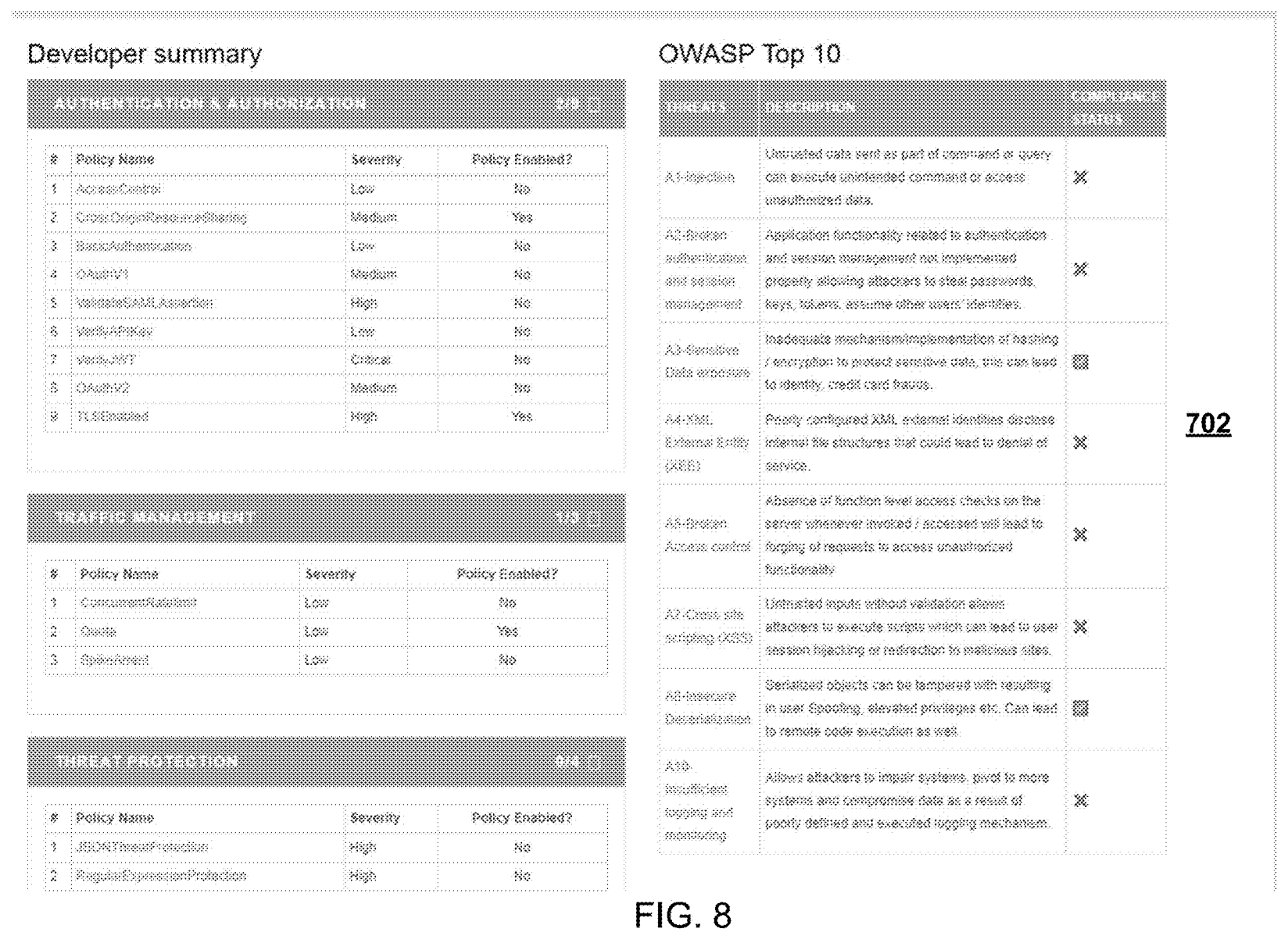

Operations may continue by generating (110) an API vulnerability report. The API vulnerability report may include an indication of any compliance failures. FIGS. 7 and 8 illustrate two examples of the API vulnerability report.

Next, operations may include generating (112) a graphical user interface for adding any security policies that may be missing from the API proxy bundle. If any security policies are added to the API proxy bundle, then the scanning engine may rescan (114) static API code in the API proxy bundle for potential security vulnerabilities. Alternatively or in addition, the user may download the updated API proxy bundle. The updated API proxy bundle may not have the security vulnerabilities found in the original API proxy bundle.

Figure 2:
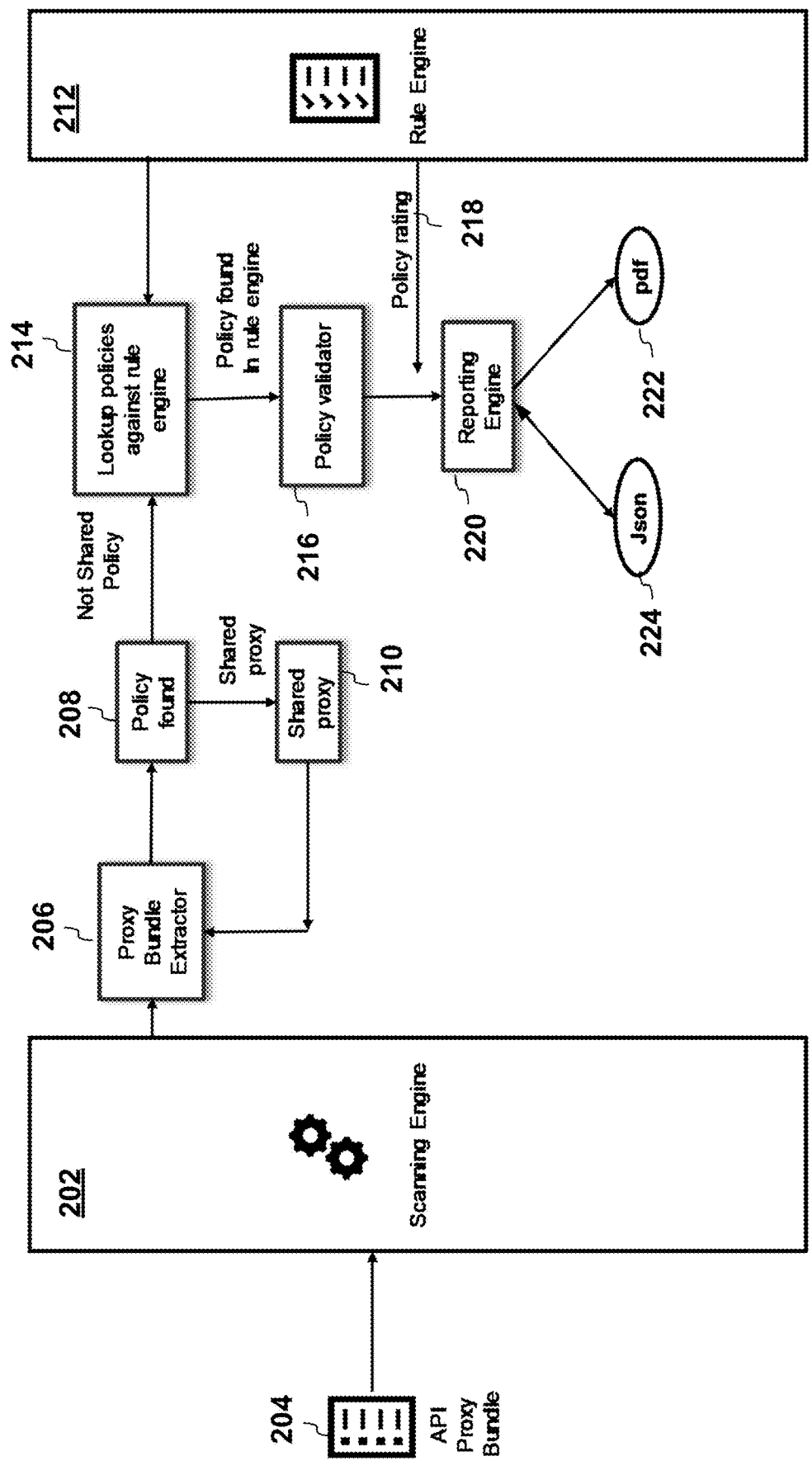
FIG. 2 is a flow diagram illustrating details of an algorithm for identifying security vulnerabilities in API proxies.

FIG. 2 is a flow diagram illustrating details of an algorithm for identifying security vulnerabilities in the API proxy. A scanning engine 202 may receive the API proxy bundle 204. A proxy bundle extractor 206 may search for any security policy specified in the API proxy bundle 204, and extract the policies 208 found. Any shared proxy 210 found may be further searched by the proxy bundle extractor 206 to extract any policy 208 associated with the shared proxy 210.

The found policies 208 may be looked up 214 in a rule engine 212 in order to find corresponding security policy rules. A policy validator 216 may verify that the found policies 208 comply with the corresponding security policy rules.

In some examples, the rule engine 212 may provide a policy rating 218 for each of the found policies 208. The policy rating 218 is a configurable and/or pre-configured weight of the policy. The policy rating 218, or order, may represent the severity or importance of the policy and/or the corresponding policy rule.

A reporting engine 220 may generate an indication of any of the compliance failures, for example, in the form of a PDF formatted report 222. The reporting engine 220 may receive requests for the indication of any of the compliance failures through a JSON interface 224 or some other programmatic interface. Alternatively or in addition, the reporting engine 220 may output the indication of the compliance failures through the JSON interface 224. Accordingly, another system, such as a build tool like Apache Maven, may request and/or receive the vulnerability report through the JSON interface 224.

Figure 3:
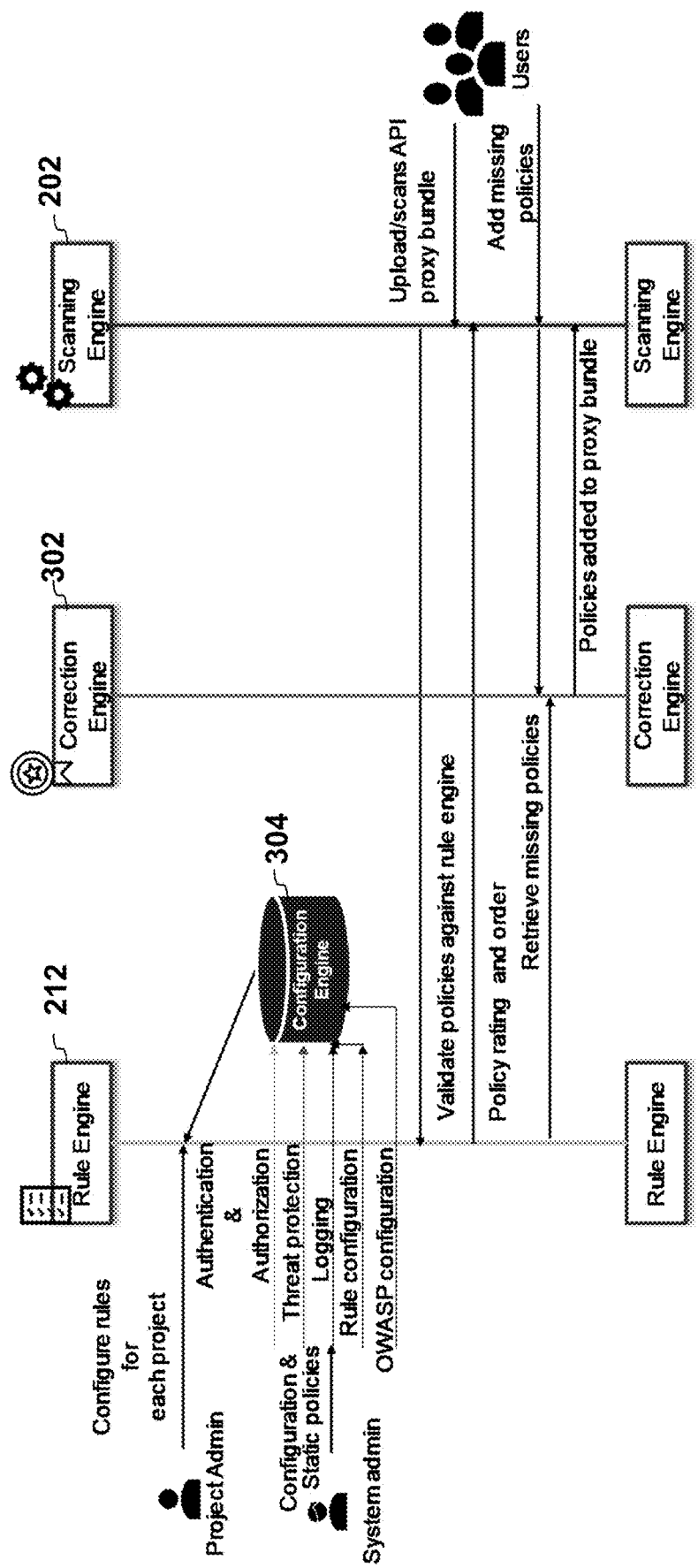
FIG. 3 is an activity diagram showing interactions between various components.

FIG. 3 is an activity diagram showing interactions between the rule engine 212, a correction engine 302, a configuration engine 304, and the scanning engine 202.

The rule engine 212 is a component that enables configuration and retrieval of the security policy rules. In some examples, the rule engine 212 enables association of rules with one or more development projects and/or API proxy bundles. Each development project may have a number of revisions.

The configuration engine 304 may store the security policy rules for each development project. The security policy rules may be entered, deleted, and/or configured through a graphical user interface, such as the graphical user interface shown in FIG. 9. In the example, shown in FIG. 3, a user account having project administrator privileges is permitted to configure the security policy rules. Alternatively or in addition, a user account having system administrator privileges may be permitted to enter, delete, and/or configure multiple categories of the security policy rules. The configuration engine 304 may include default definitions of the security policies. For example, the configuration engine 304 may include default XML for a security policy. As described in more detail below, the default XML for a security policy may be in a format, which if necessary, may be added to the API proxy bundle 204 in order to add the security policy to the API proxy bundle 204.

The scanning engine 202 scans the API proxy bundle 204 for compliance with the rules. In addition, the policy rating for the rules may be retrieved by the rule engine 212 from the configuration engine 304. The scanning engine 202 determines compliance failures in the API proxy bundle 204 by applying the relevant policy security rules, which are obtained by the rule engine 212 from the configuration engine 304, to the policies identified in the API proxy bundle 204. In addition, the scanning engine 202 identifies policies missing from the API proxy bundle 204 by applying the relevant policy security rules obtained by the rule engine 212 from the configuration engine 304. The missing policies are policies that should apply to an API according to the applicable rules, but were not properly enabled or included in the API proxy bundle 204.

Figure 10:
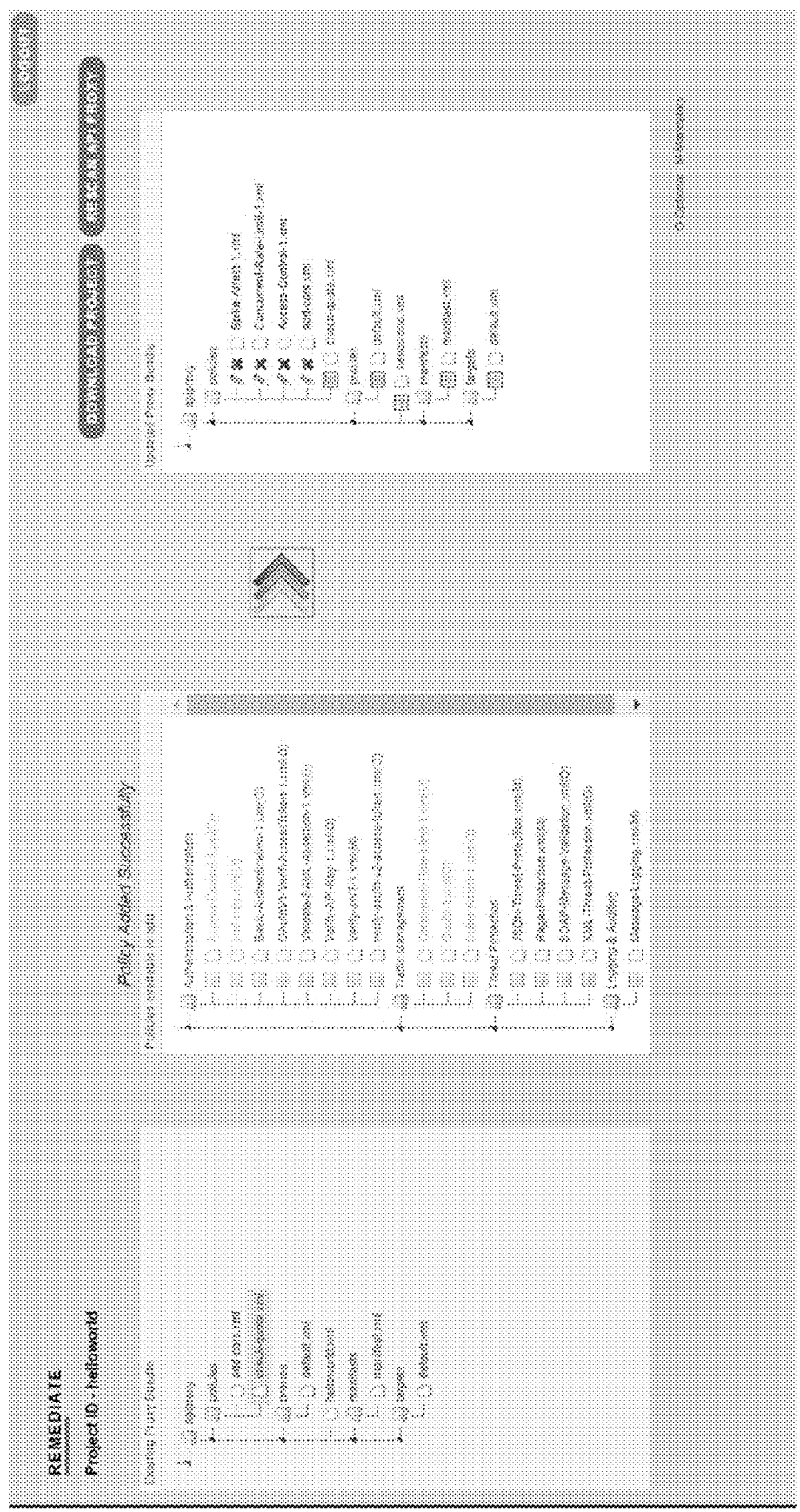
FIG. 10 illustrates an example of a graphical user interface through which security policies missing from the API proxy bundle may be identified and corrected.

Among other things, the correction engine 302 retrieves the default definitions of the missing security policies by requesting them from the rule engine 212. The correction engine 302 may insert the default definitions of the policies (for example, in XML format) into the API proxy bundle 204. Alternatively or in addition, a user may request the correction engine 302 to add one or more of the missing policies. The user may do so through a graphical user interface, such as is shown in FIG. 10. The updated API proxy bundle 204 may be sent to the scanning engine 202 for a second scan for any compliance failures.

Figure 4:
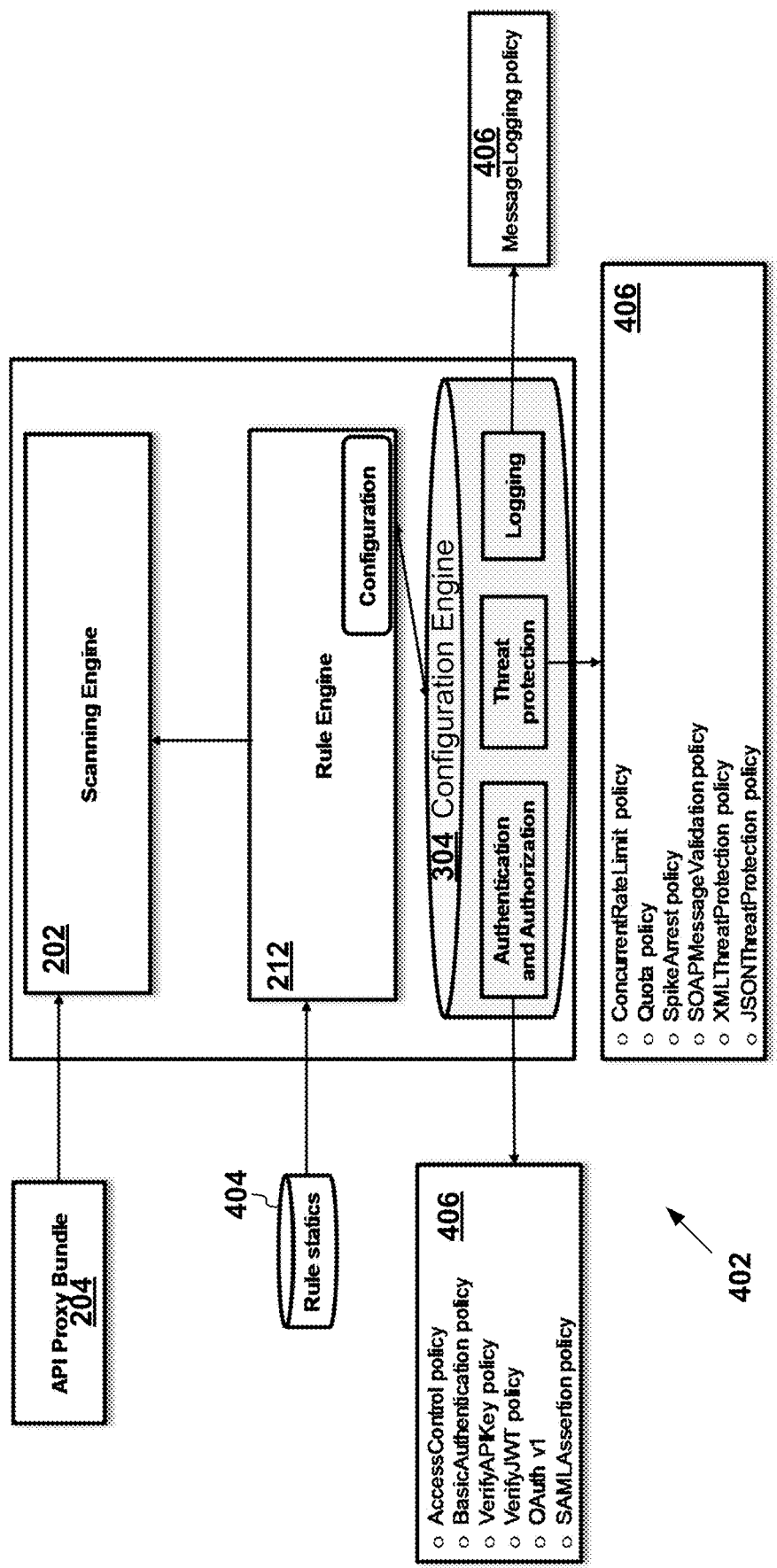
FIG. 4 illustrates an example of the structure of a system for identifying security vulnerabilities in an API proxy.

FIG. 4 illustrates an example of the structure of a system 402 for identifying security vulnerabilities in an API proxy. The system 402 in the illustrated example includes multiple Java classes, including the scanning engine 202, the rule engine 212, and the configuration engine 304. The system 402 may include the security policy rules 404 (designated rule statics in the figure). In the illustrated example, the security policy rules 404 are not stored in the configuration engine 304. In other examples, the security policy rules 404 may be stored in the configuration engine 304. Multiple categories of security policies 406 (for example, authentication and authorization, threat protection, and logging) are shown in the configuration engine 304.

Figure 5:
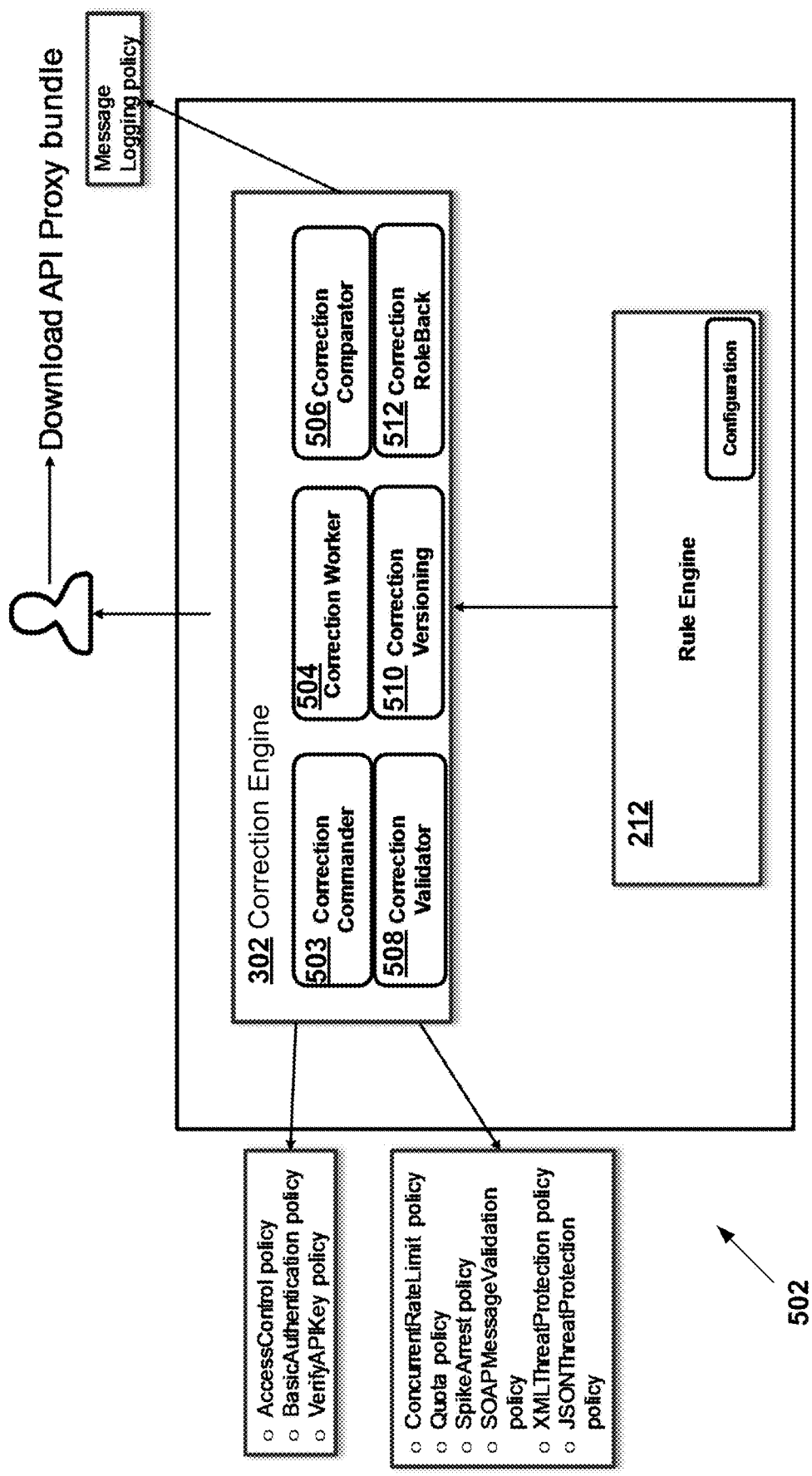
FIG. 5 illustrates an example of the structure of a system for identifying missing security policies and correcting an API proxy bundle to include the missing security policies.

FIG. 5 illustrates an example of the structure of a system 502 for identifying missing security policies and correcting the API proxy bundle 204 to include the missing security policies. The system 502 may include the correction engine 302 and the rule engine 212. The correction engine 302 in the illustrated example includes multiple Java classes, including a correction commander class 503, a correction worker class 504, a correction comparator class 506, a correction validator class 508, a correction versioning class 510, and a correction rollback class 512.

The correction commander class 503 identifies and recommends a fix in a policy, whether the policy is applied, and whether the policy is applied adequately. The correction worker class 504 changes or updates the proxy bundle 204 as per instructions from, or as directed by, the correction commander 503 class. The correction validator class 508 validates the corrections, for example, by requesting the scanning engine 202 to scan the proxy bundle 204 updated by the correction worker class 504. The correction versioning class 510 is a versioning engine that tracks changes and/or maintains a history of the changes to the proxy bundle 204. The correction rollback class 512 may rollback the proxy bundle 204 to an earlier version, for example, in response to user input.

Figure 6:
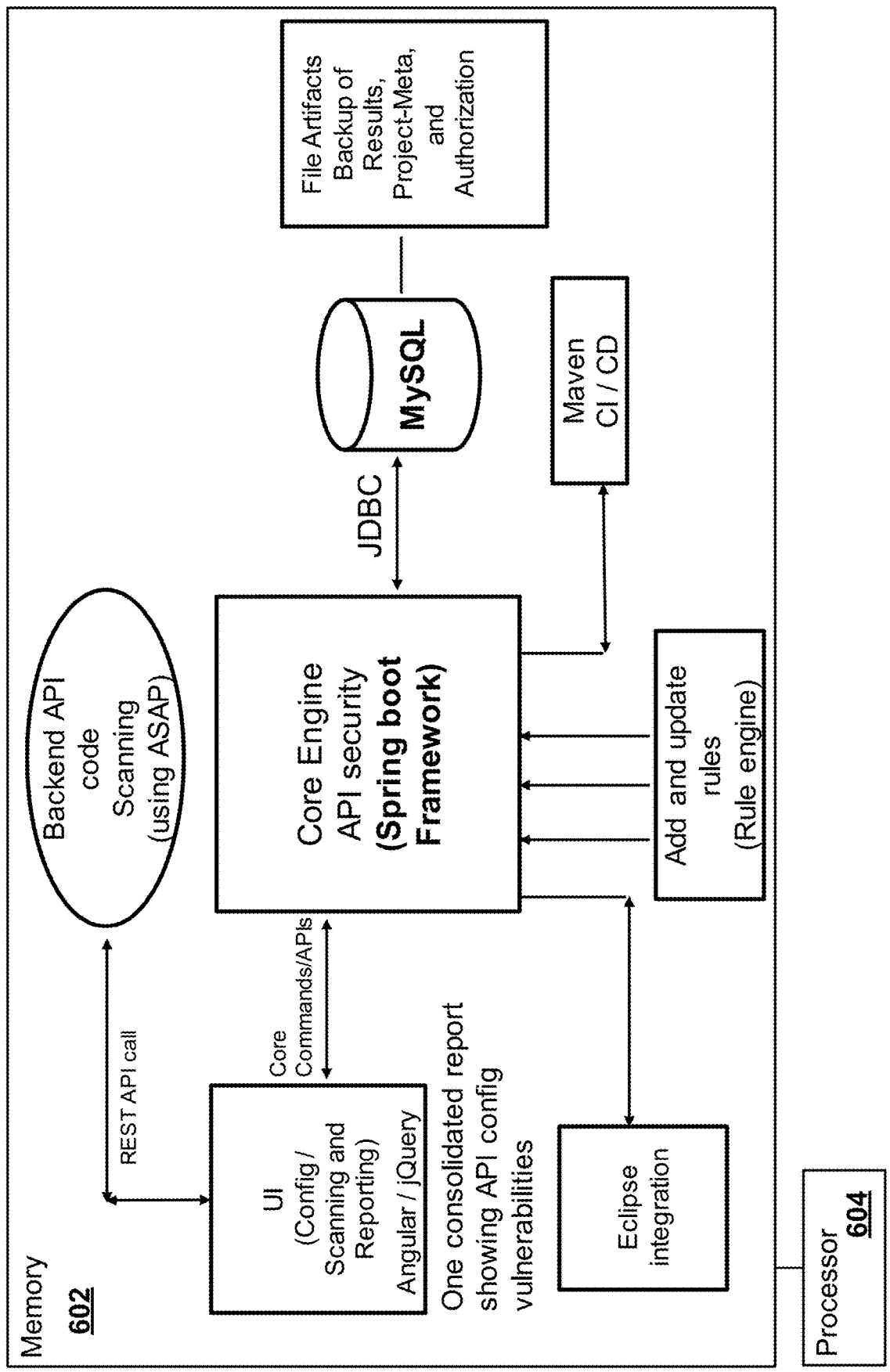
FIG. 6 illustrates an example architecture for a system for identifying security vulnerabilities and/or a system for identifying missing security policies and correcting an API proxy bundle to include the missing security policies.

FIG. 6 illustrates an example architecture for the system 402 for identifying security vulnerabilities and/or the system 502 for identifying missing security policies and correcting the API proxy bundle 204 to include the missing security policies. The system 402 and/or 502 may include a memory 602 and a processor 604. The memory may include the components of the system 402 and/or 502, such as the scanning engine 202, the reporting engine 220, the rule engine 212, the correction engine 302, the configuration engine 304, and the security policy rules 404 (not shown). In addition, the memory 602 may include generated graphical user interfaces (not shown) that the processor 604 is configured to cause to be displayed.

The processor 604 may be in communication with the memory 602. The processor 604 may also be in communication with additional elements, such as a display and/or a network interface. Examples of the processor 604 may include a general processor, a central processing unit, a microcontroller, a server, an application specific integrated circuit (ASIC), a digital signal processor, a field programmable gate array (FPGA), and/or a digital circuit, analog circuit.

The processor 604 may be one or more devices operable to execute logic. The logic may include computer executable instructions or computer code embodied in the memory 602 or in other memory that when executed by the processor 604, cause the processor to perform the features implemented by the logic. The computer code may include instructions executable with the processor 604.

The memory 602 may be any device for storing and retrieving data or any combination thereof. Examples of the memory 602 may include non-volatile and/or volatile memory, such as a random access memory (RAM), a read-only memory (ROM), an erasable programmable read-only memory (EPROM), or flash memory. Alternatively or in addition, the memory 602 may include an optical, magnetic (hard-drive) or any other form of data storage device.

FIG. 7 illustrates a first example of a graphical user interface that includes the API vulnerability report 702. The API vulnerability report may include an indication of any compliance failures. For example, one such indication is an executive summary showing the percentage of the security policies in each category that comply with the security policy rules 404. Another example of such an indication is a graph showing a percentage of the total number of compliance failures that is in each severity (such as critical, high, medium, and low).

FIG. 8 illustrates a second example of a graphical user interface that includes the API vulnerability report 702. The API vulnerability report 702 in the illustrated example includes a developer summary. In the developer summary, the indication of the compliance failure includes an indication that some of the predefined security policies are not enabled for the API proxy. The developer summary also includes the name of each policy and its corresponding severity. The information about each policy is displayed in a section dedicated to a category to which the policy belongs.

The set of security rules may include rules for compliance with a predetermined set of policies that address a plurality of web application security risks. An indication of an extent to which the configuration of the API proxy complies with the predetermined set of policies is shown in an OWASP Top 10 section. The web application security risks in this example include current Top 10 Most Critical Web Application Security Risks as published by Open Web Application Security Project (OWASP).

Figure 9:
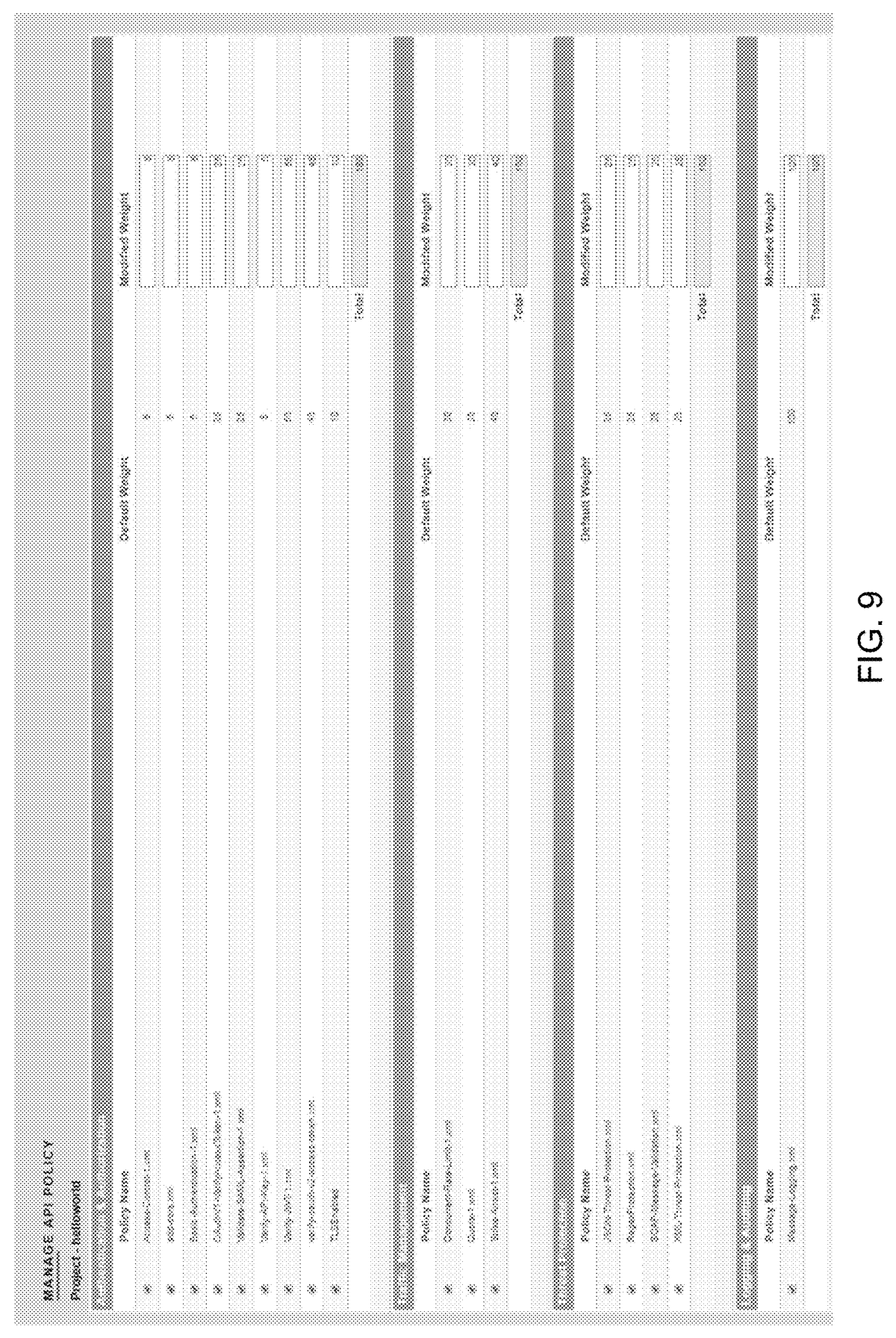

FIG. 9 illustrates an example of a graphical user interface through which the security policy rules 404 may be entered, deleted, and/or configured. In the illustrated example, the security policy rules 404 are grouped by category. The corresponding security policy name is shown along with a corresponding default weight (in other words, severity) of the security policy rule 404. In this example, each of the security policy rules 404 corresponds to a security policy, so the default weight or severity shown is also the default weight or severity of the security policy as wells as the security policy rule. The graphical user interface permits the weights or severities to be adjusted.

FIG. 10 illustrates an example of a graphical user interface through which security policies missing from the API proxy bundle 204 may be identified and corrected. A leftmost panel shows the security policies that are in the API proxy bundle 204. A middle panel shows the policies that are available to add to the API proxy bundle after some of the missing security policies were added to the API proxy bundle 204. In other words, the middle panel shows the security policies that are still missing from an updated version of the API proxy bundle 204. Stated differently, the middle panel compares an specification with a developed or corrected proxy. A right-most panel shows the security policies in the updated version of the API proxy bundle 204. A user may click on a "rescan API proxy" button to rescan the updated version of the API proxy bundle 204 for compliance with the security policy rules 404. Alternatively, the user may click on the "download project" button to download the updated version of the API proxy bundle 204.

The systems 402 and/or 502 may be implemented with additional, different, or fewer components than illustrated in FIGS. 4, 5, and 6. For example, the system 402 and 502 may be implemented in a single system that combines the components of each of the systems 402 and 502.

Each component may include additional, different, or fewer components. For example, the correction engine 302 may be implemented with a different set of classes than shown in FIG. 5.

The systems 402 and 502 may be implemented in many different ways. Each module, such as the scanning engine 202, the rule engine 212, the reporting engine 220, the configuration engine 304, the correction engine 302, may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory 602, for example, that comprises instructions executable with the processor 604 or other processor to implement one or more of the features of the module. When any one of the module includes the portion of the memory that comprises instructions executable with the processor, the module may or may not include the processor. In some examples, each module may just be the portion of the memory 602 or other physical memory that comprises instructions executable with the processor 604 or other processor to implement the features of the corresponding module without the module including any other hardware. Because each module includes at least some hardware even when the included hardware comprises software, each module may be interchangeably referred to as a hardware module.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device. However, the computer readable storage medium is not a transitory transmission medium for propagating signals.

The processing capability of the system 402 and/or 502 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is exemplary in nature, rather than limiting. For example, although selected aspects, features, or components of the implementations are depicted as being stored in memories, all or part of the system or systems may be stored on, distributed across, or read from other computer readable storage media, for example, secondary storage devices such as hard disks, flash memory drives, floppy disks, and CD-ROMs. Moreover, the various modules and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program or apparatus. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action includes setting a Boolean variable to true and the second action is initiated if the Boolean variable is true.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

What is claimed is:

1. A system for identifying security vulnerabilities related to an application programming interface (API), the system comprising:
    a processor; and
    a memory accessible by the processor, the processor configured to:
    search for any security policy specified in an API proxy bundle, the API proxy bundle including a configuration of an API proxy for the API, wherein the API proxy is executable in an API gateway of an API management platform, and wherein the configuration of the API proxy identifies zero or more security policies associated with the API proxy and enforceable by the API gateway, wherein the configuration of the API proxy includes XML in the API proxy bundle identifying the security policies associated with the API proxy;
    determine a compliance failure, which is a failure of the configuration of the API proxy to comply with a set of security rules;
    cause an indication of the compliance failure to be outputted;
    identify and recommend a fix to a predetermined security policy, wherein the set of security rules includes a rule requiring the predetermined security policy to be enabled for the API proxy, wherein the compliance failure is a failure of the configuration of the API proxy to specify that the predetermined security policy is enabled, and the fix is to enable the predetermined security policy in the configuration of the API proxy; and
    correct the compliance failure in the configuration of the API proxy by a change of the XML identifying the security policies associated with the API proxy.

2. The system of claim 1, wherein the set of security rules indicate a plurality of categories of policies are to be enabled in the configuration of the API proxy, and the indication of the compliance failure includes an indication of a relative number of polices that are not enabled in each of the categories.

3. The system of claim 1, wherein the set of security rules includes rules for compliance with a predetermined set of policies that address a plurality of web application security risks, and wherein the processor is configured to cause an indication of an extent to which the configuration of the API proxy complies with the predetermined set of policies.

4. The system of claim 1, wherein the processor is configured to cause the indication of the compliance failure to be displayed in a graphical user interface.

5. A non-transitory computer readable storage medium comprising computer executable instructions, the computer executable instructions executable by a processor, the computer executable instructions comprising:
    instructions executable to search for any security policy specified in an API proxy bundle, the API proxy bundle including a configuration of an API proxy for the API, wherein the API proxy is executable in an API gateway of an API management platform, and wherein the configuration of the API proxy identifies zero or more security policies associated with the API proxy and enforceable by the API gateway, wherein the configuration of the API proxy includes XML in the API proxy bundle identifying the security policies associated with the API proxy;
    instructions executable to determine a compliance failure, which is a failure of the configuration of the API proxy to comply with a set of security rules;
    instructions executable to cause an indication of the compliance failure to be outputted; and
    instructions executable to identify and recommend a fix to a predetermined security policy, wherein the set of security rules includes a rule requiring the predetermined security policy to be enabled for the API proxy by including a predetermined element in the API proxy, wherein the compliance failure is a failure of the configuration of the API proxy to specify that the predetermined security policy is enabled by including the predetermined element of the predetermined security policy, and the fix is to enable the predetermined security policy in the configuration of the API proxy; and instructions executable to correct the compliance failure in the configuration of the API proxy by a change of the XML identifying the security policies associated with the API proxy.

6. The computer readable storage medium of claim 5 further comprising instructions executable to generate a user interface that displays a comparison between the API proxy bundle, which may or may not have been updated, and a specification that includes a list of security rules that are to be enabled in a project, wherein the comparison includes an indication that the configuration of the API proxy is missing the predetermined security policy in response to the compliance failure.

7. The computer readable storage medium of claim 5 further comprising instructions executable to generate a user interface that accepts user input to add the predetermined security policy in response to a determination that the configuration of the API proxy is missing the predetermined security policy.

8. The computer readable storage medium of claim 5 further comprising a correction worker class including instructions executable to correct any security policies in the configuration of the API proxy to comply with the set of security rules.

9. The computer readable storage medium of claim 5 further comprising instructions executable to generate a user interface through which the set of security rules are configurable.

10. The computer readable storage medium of claim 5 further comprising a correction validator class, which includes instructions executable to validate any corrections made to the API proxy bundle.

11. A computer-implemented method to identify and correct security vulnerabilities, the method comprising:
searching for any security policy specified in an API proxy bundle, the API proxy bundle including a configuration of an API proxy for the API, wherein the API proxy is executable in an API gateway of an API management platform, and wherein the configuration of the API proxy identifies zero or more security policies associated with the API proxy and enforceable by the API gateway, wherein the configuration of the API proxy includes XML in the API proxy bundle identifying the security policies associated with the API proxy;

determining a compliance failure, which is a failure of the configuration of the API proxy to comply with a set of security rules;

causing an indication of the compliance failure to be outputted by generating a user interface that displays a comparison between the API proxy bundle, which may or may not have been updated, and a specification that includes a list of security rules that are to be enabled in a project, wherein the comparison includes an indication that the configuration of the API proxy is missing the predetermined security policy in response to the compliance failure;

updating the API proxy bundle to bring the API proxy bundle into compliance with the set of security rules by changing the XML identifying the security policies associated with the API proxy; and versioning any updates to the API proxy bundle and/or rolling back an update to the API proxy bundle.

12. The method of claim 11 wherein the user interface accepts user input to add a predetermined security policy in response to a determination that the configuration of the API proxy is missing the predetermined security policy.

\* \* \* \* \*